April 17, 1962 A. C. MACPHERSON 3,030,577
APPARATUS FOR CALIBRATING MICROWAVE REFLECTIVITY
COEFFICIENT STANDARDS
Filed June 10, 1954

INVENTOR
Alan C. Macpherson

BY Arthur Vinograd

ATTORNEY

United States Patent Office 3,030,577
Patented Apr. 17, 1962

3,030,577
APPARATUS FOR CALIBRATING MICROWAVE
REFLECTIVITY COEFFICIENT STANDARDS
Alan C. Macpherson, Silver Spring, Md., assignor to the
United States of America as represented by the Secretary of Commerce
Filed June 10, 1954, Ser. No. 435,959
2 Claims. (Cl. 324—58.5)

This invention relates to transmission line measuring systems and more particularly to an improved system for measuring the standing-wave ratio of sliding terminations in waveguides with a high degree of precision.

A present need exists for precision microwave standards of power standing-wave ratio. Such standards may be defined in terms of loads which will produce very accurately known standing wave ratios in a section of wave guide of particular dimensions. These load standards serve about the same purpose that standards of resistance, capacitance, and inductance serve at low frequencies. If these standards are continuously adjustable, microwave bridge techniques can be employed to compare them with unknown standing wave ratios. If nonadjustable, they can be used to check impedance measuring equipment such as slotted lines, resonant lines, reflectometers, etc. In addition they have a direct application in situations in which an arbitrary but accurately known standing wave ratio is needed.

Two approaches to the problem of producing precise standing wave ratio standards are in wide use at present. The first is concerned with the direct evaluation of the combination of a load and section of wave guide to be used as a standard. It consists of a load connected to an end of a wave guide and preceded by a metallic obstruction in the guide. The load is usually matched to the guide; that is, it is chosen of such value as to equal the characteristic impedance of the wave guide. If the equivalent T or pi network of the discontinuity created by the metallic obstruction can be calculated, then the standing wave ratio of the combination may be mathematically determined. Some objections to this approach are (1) it is difficult to take into account any losses that may be present in the wave guide, (2) the effects of slight deviations from the ideal geometrical configuration of the obstruction are exceedingly difficult to evaluate, (3) the standing wave ratio is not continuously variable, and (4) any mismatch at the load gives rise to additional error in the standing wave ratio calculation.

The second approach to the problem involves actual measurement of the standing wave produced by the load to be standardized. It is with this approach that applicant's invention is concerned. Such measurement in accordance with known practice involves the use of a slotted wave guide and a moving probe coupled to a detector. It should be noted that when a moving probe is used, it is impossible in principle to get an undistorted standing wave pattern while extracting finite power from the main line. The closer one couples to the main line, in order to increase the detector signal-to-noise ratio, the more distorted the standing-wave pattern becomes, and, of course, the ratio of the power at a maximum to that at a minimum does not give an accurate power standing wave ratio. This distortion depends not only on the probe insertion but on the generator impedance as well. Errors also arise because of detector nonlinearity, and slot and connector discontinuities. While progress has been made in attacking some of these effects, a general overall theory which permits simultaneous correction for all of these effects is unknown.

In order to overcome the above mentioned difficulties the present apparatus has been developed. In accordance with the invention means are provided for accurately measuring the standing wave ratio produced by various loads. These calibrated loads can then be used as standards in determining the standing wave ratios of unknown loads. The present measuring apparatus includes means for moving the load, the reflectivity of which is to be measured with respect to a stationary detector. A further feature of this invention is that the detector is coupled to the generator and load by a matched H-plane T junction.

One object of this invention is to provide means for accurately measuring microwave power standing wave ratios incident to a particular load in a waveguide.

Another object of this invention is to provide means for accurately determining standing wave ratio produced by a load by measuring the entire standing wave pattern.

A further object of the invention is to provide means for establishing accurate absolute load standards for determining microwave standing wave ratios.

Other uses and advantages of the invention will become apparent upon reference to the specification and drawings.

FIGURE 1 is a plot of detector response versus distance showing a typical power standing wave along a wave guide. To the first approximation this is a cosine wave and may be represented by the formula $$P\alpha\frac{1}{2}[(r^2+1)-(r^2-1)\cos 2\theta]$$

where P is the detector power
r is the voltage standing wave ratio
θ is the electrical position of the sliding load.

However, upon mathematical analysis the typical wave plot obtained with prior art measuring devices may prove to differ substantially from that of a true cosine wave. This difference indicates the inaccuracy of the measuring device.

Figure 2:
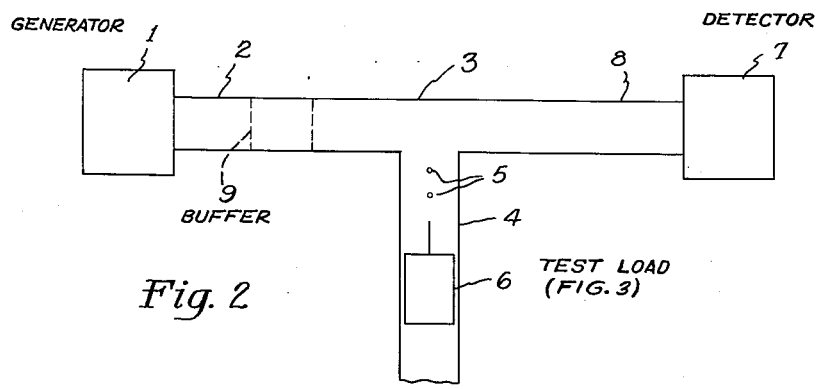
FIGURE 2 is a schematic diagram of applicant's microwave measuring apparatus.

FIGURE 2 shows a microwave generator 1 supplying dominant mode R-F power to arm 2 of a wave guide H-plane or shunt T shown generally at 3. The test load 6, the reflectivity of which is to be determined, is adjustably positioned in perpendicular arm 4 of wave guide T 3. The energy to detector 7 is supplied via arm 8 of wave guide T 3. Buffer means or padding 9 is provided in arm 2 to isolate the generator from the rest of circuit. Arm 4 of wave guide T3 also includes turning screws 5. While only two such screws are shown it is obvious that more may be utilized if it is desirable to operate applicant's invention over a band of frequencies.

Figure 1:
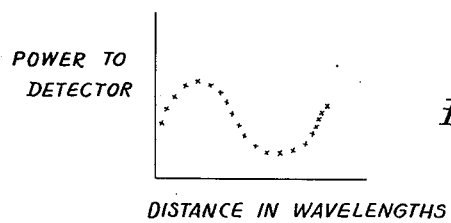
FIGURE 1 is a graph of a typical power standing wave.
Figure 3:
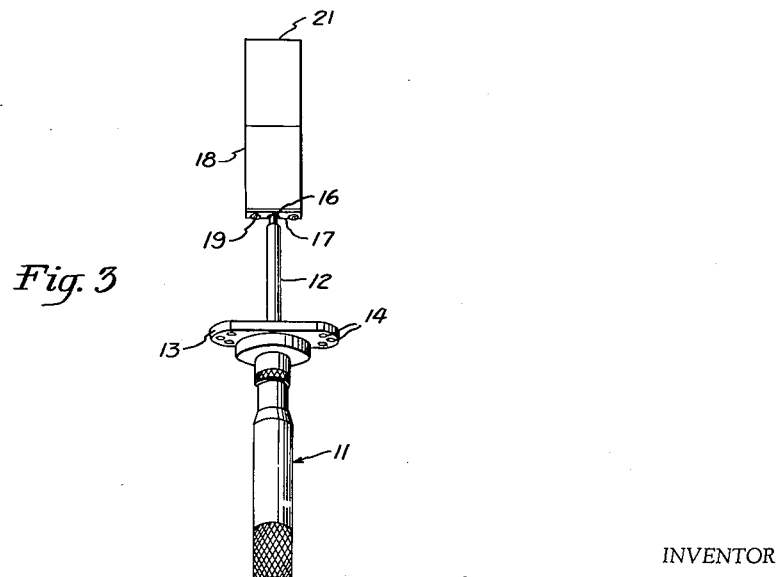
FIGURE 3 illustrates one embodiment of the sliding load employed in FIGURE 2.

FIGURE 3 shows in greater detail the meas for adjustably mounting a one type test load in accordance with the practice of applicant's invention. At 11 is shown a rotatable micrometer-type handle through which extends mounting rod 12. Attached to the conventional micrometer type handle 11 is a flange 13 provided with suitable holes 14 for attachment to the end of the perpendicular arm 4 of the wave guide. Rod 12 terminates in a ball and socket joint 16 formed by the end of the rod and supporting plate 17, which is in turn secured to metallic block 18 by screws 19. Block 18 is dimensioned so as to fit in close sliding engagement within a wave guide. Secured to the block 18 is the particular test load 21, corresponding to 6 in FIG. 1. The test load may take any desired form.

With the T nominally matched, generator 1 supplies R-F energy to the sliding test load 6 which is inserted in arm 4. Since it is desired to measure the ratio of the incident to the reflected waves in the waveguide, it will be apparent that the particular reflectivity of the test load 6, corresponding to element 21 in FIG. 3, will affect the standing-wave ratio as a function of its position in the perpendicular arm 4 of the waveguide relative to detector 7. Readings of the relative power values of the standing wave produced by the reflectivity of the particular test load are then taken at the detector for various positions of the load. The test position of the load along the guide is read from the calibrations on the micrometer type handle 11. The readings taken at the detector are usually plotted and then mathematically analyzed. This analysis yields a correction factor which may be applied to the readings to derive the true value of standing wave ratio. Applicant's mathematical analysis employed in the present invention is analogous to that disclosed in an article by W. Altar et al. entitled "Probe Error in Standing Wave Detectors," Proc. IRE, vol. 34, No. 1, pages 33P–44P, January 1946. The final formulas in applicant's mathematical analyses are identical to those of the article referred to above. However, due to the physical makeup of applicant's invention the correction factors obtained from applicant's mathematical analyses take into account any generator mismatch and therefore yield a more accurate standing wave ratio than the slotted wave guide techniques of the prior art.

In a slotted wave guide device, the probe moves along the guide as readings are taken at the detector. Errors arise when the generator is not perfectly matched due to the fact that the detector moves both with respect to the generator and the load. The known mathematical analyses techniques lend themselves only to compensation of the errors due to the movement of the probe detector with respect to the load and are necessarily derived on the assumption that the generator is perfectly matched. Such an assumption is not sufficiently valid for the extreme accuracy required in establishing standards.

In the present invention the detector is stationary with respect to the generator and only the distance between the detector and sliding test load varies. The analyses techniques when applied to the present invention therefore provide correction factors which result in much more accurate standing wave ratio values, since the fact that the generator is stationary with respect to the detector makes it possible to account for generator mismatch.

Arm 4 of applicant's H-plane T may be matched in the conventional manner. With the cold generator 1 and the detector 7 coupled to arms 2 and 8 respectively, energy is supplied to arm 4 for purposes of matching the H-plane T. The T is then matched by means of the tuning screws 5 so that no reflection is seen looking into arm 4.

The above described matching procedure is desirable but not necessary in using applicant's invention. Since it is concerned with measurement for establishing very precise standards, the readings are generally mathematically analyzed and correction factors applied whether the T is originally matched or not. The advantage of carrying out the tuning proceduer is that the resultant standing wave pattern will be almost exactly a cosine in which case the correct SWR will be very accurately given by the ratio of the maximum to minimum detector power. Therefore, once it has been verified by using a particular sliding load that the SW pattern is indeed a cosine wave, any number of sliding loads may be measured simply by measuring the ratio of the maximum to the minimum detector power. Thus, a great deal of time is saved in taking data and also in calculating the correct SWR.

Other more obvious advantages of applicant's invention are the simple mechanical construction required and the lack of the necessity for machining a slot. Also, it has been found experimentally that the mechanical irregularities are much smaller for a well constructed sliding load than for a probe moving in a slot in the wave guide. This is probably because the sliding load is automatically registered by the inside of the wave guide. The ratio of power delivered to the detector to power delivered to the load is much larger than that obtained from a probe with reasonable penetration. Much tighter coupling to the detector is afforded by the H-plane T. In the present equipment a 5-watt generator is used, which further increases the detector power. The large power into the detector arm allows the use of an absolute power meter instead of the usual crystal detector or superheterodyne. Thus, detector nonlinearity is for all practical purposes eliminated. In the present equipment a commercial barretter mount is operated in a manually balanced Wheatstone bridge. This makes for a very simple generator and detector system, since no modulator is needed and the detector is a simple D.-C. circuit without vacuum tubes. Since the bridge is rebalanced at each point, the R-F impedance of the detector is not a function of R-F power.

It will be apparent that the embodiments shown are only exemplary and that various modifications can be made in construction and arrangement within the scope of my invention as defined in the appended claims.

What is claimed is:

1. Apparatus for determining the reflectivity of a load to be used as a termination in a waveguide by accurately measuring the standing-wave ratio consequent to said load comprising: a waveguide junction having at least three arms, two of said arms being co-linear, said third arm extending perpendicularly to said two arms to form a waveguide T, a microwave generator tightly coupled to one of said co-linear arms, a microwave detector tightly coupled and connected in a fixed position to a second of said co-linear arms, means for adjustably positioning said load in the perpendicular arm of said junction, impedance matching tuning means in said perpendicular arm for initially matching the waveguide T to prevent microwave reflection in said perpendicular arm, and calibrated means on said adjustable load positioning means for registering the degree of displacement of said load adjusting means necessary to subsequently reestablished standing waves in said perpendicular arm as manifested by the power measured by said detector.

2. A device according to claim 1 in which said waveguide T is an H-plane T.

References Cited in the file of this patent
UNITED STATES PATENTS

| | | |
|---|---|---|
| 2,411,553 | Ramo | Nov. 26, 1946 |
| 2,602,835 | Hershberger | July 8, 1952 |
| 2,664,502 | Roberts | Dec. 29, 1953 |
| 2,691,759 | Younker | Oct. 12, 1954 |
| 2,746,015 | Alsberg | May 15, 1956 |
| 2,818,547 | Laemmel | Dec. 31, 1957 |
| 2,853,678 | Tomiyasu | Sept. 23, 1958 |

OTHER REFERENCES

"Technique of Microwave Measurements," Montgomery, McGraw-Hill Book Company, 1947, pages 623, 624, and 625.